(12) United States Patent
Jeong et al.

(10) Patent No.: US 9,398,274 B2
(45) Date of Patent: Jul. 19, 2016

(54) MULTIVISION DEVICE AND LENS BAR ATTACHED TO THE SAME

(71) Applicant: LG ELECTRONICS INC., Seoul (KR)

(72) Inventors: Chansung Jeong, Pyeongtaek-si (KR); Sangtae Park, Pyeongtaek-si (KR); Hoon Hur, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/033,946

(22) Filed: Sep. 23, 2013

(65) Prior Publication Data
US 2015/0015974 A1  Jan. 15, 2015

(30) Foreign Application Priority Data
Jul. 15, 2013  (KR) .......................... 10-2013-0082892

(51) Int. Cl.
| | |
|---|---|
| *G02B 3/04* | (2006.01) |
| *H04N 9/12* | (2006.01) |
| *G02B 3/06* | (2006.01) |
| *G02B 27/02* | (2006.01) |

(52) U.S. Cl.
CPC .. *H04N 9/12* (2013.01); *G02B 3/06* (2013.01); *G02B 27/02* (2013.01)

(58) Field of Classification Search
CPC ............. H04N 9/12; G02B 3/06; G02B 27/02
USPC .......................................... 359/642, 725, 811
See application file for complete search history.

(56) References Cited

U.S. PATENT DOCUMENTS

| | | | |
|---|---|---|---|
| 2009/0225506 A1* | 9/2009 | Lee et al. ................. | 361/679.21 |
| 2012/0228481 A1* | 9/2012 | Tanaka et al. .............. | 250/214.1 |
| 2013/0076971 A1* | 3/2013 | Nishimoto et al. ........... | 348/360 |
| 2013/0279177 A1* | 10/2013 | Moriwaki et al. ............ | 362/330 |
| 2013/0329303 A1* | 12/2013 | Inomoto et al. .............. | 359/642 |
| 2014/0218918 A1* | 8/2014 | Moriwaki ..................... | 362/237 |

* cited by examiner

*Primary Examiner* — Bumsuk Won
*Assistant Examiner* — Grant Gagnon
(74) *Attorney, Agent, or Firm* — Ked & Associates, LLP

(57) ABSTRACT

A multivision device, which may minimize a screen split zone, and a lens bar attached to the same are disclosed. The multivision device comprises a plurality of display parts; a frame part disposed between two adjacent ones of the plurality of display parts; and a lens bar disposed above the frame part, wherein the lens bar includes a first surface, and a second surface which is located at an opposite side of the first surface and faces the frame part, the first surface includes a first area which is gradually close to the second surface towards a center of the lens bar from a side of the lens bar, and an air gap exists between the lens bar and the frame part.

19 Claims, 13 Drawing Sheets (a)

(a)  (b)

(a)          (b)

FIG. 12
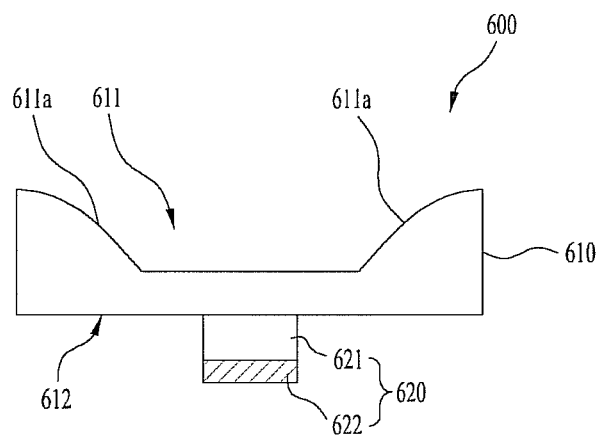
(a)
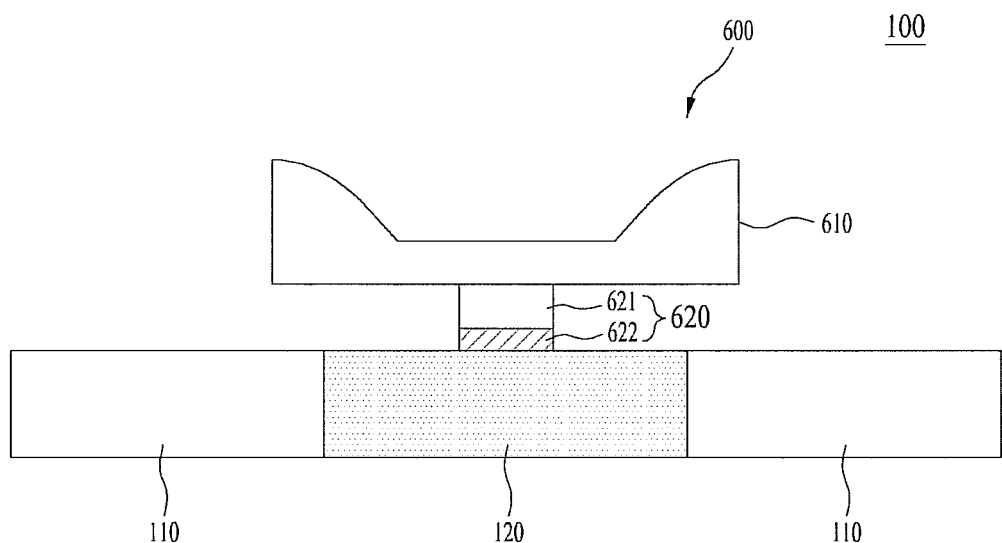
(b)

FIG. 13
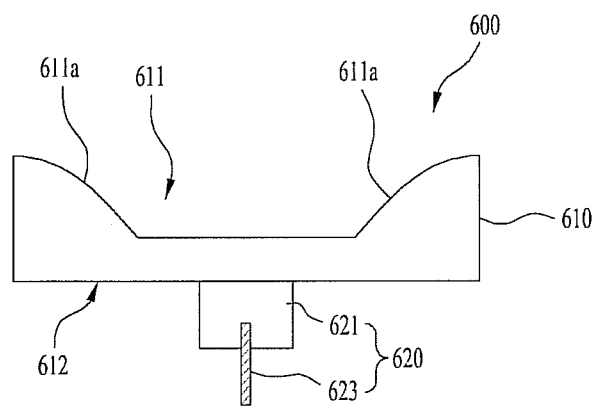
(a)
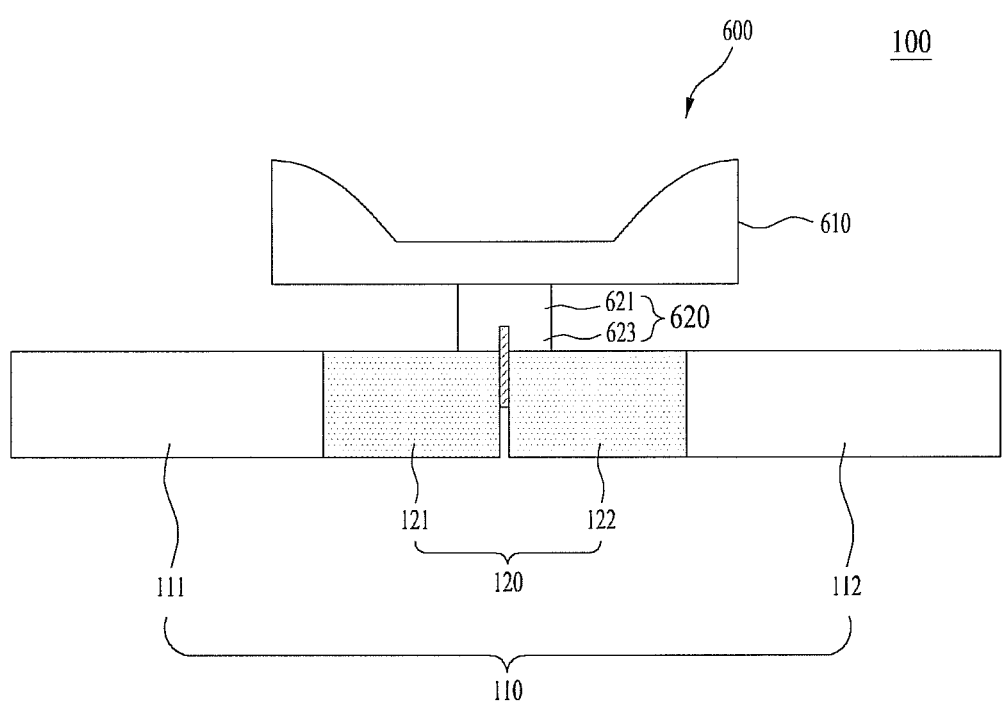
(b)

FIG. 14
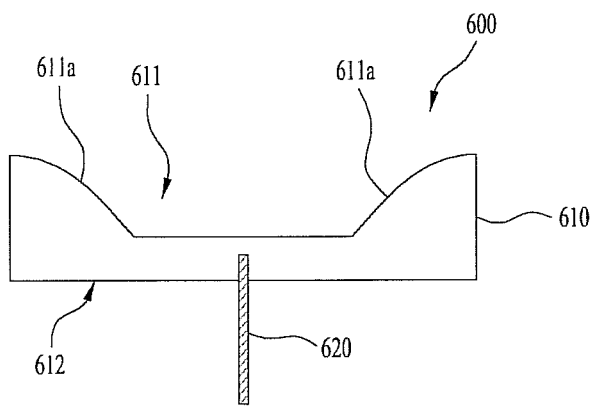
(a)
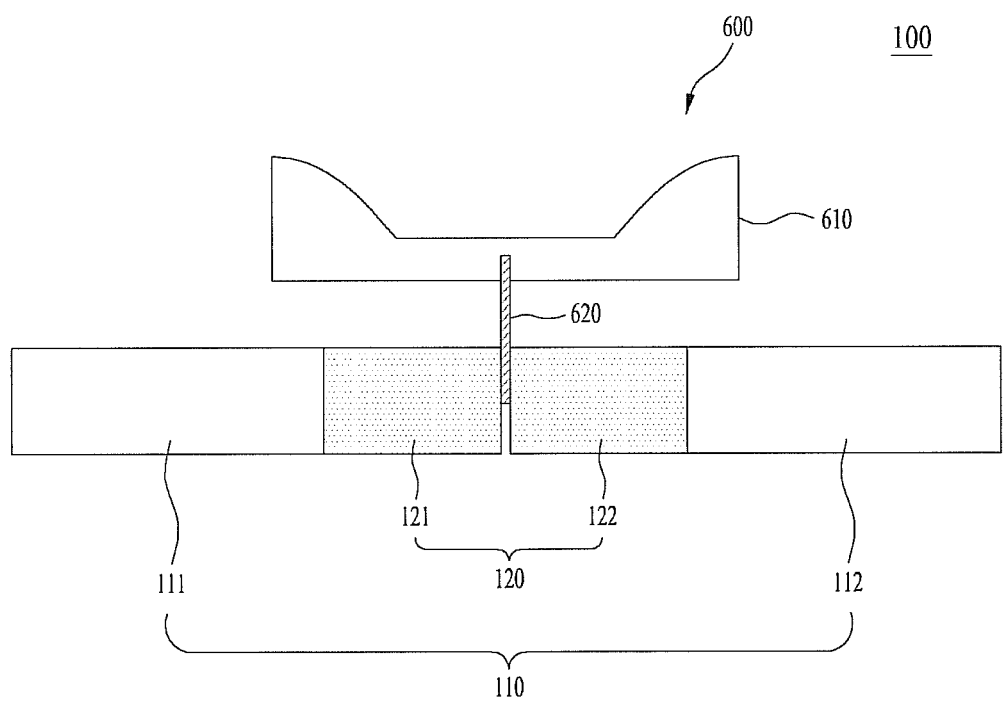
(b)

FIG. 15
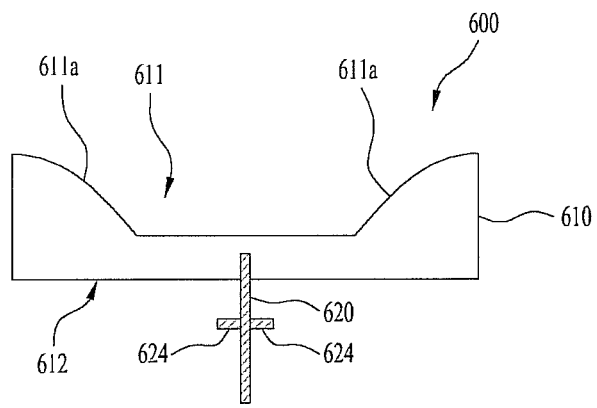
(a)
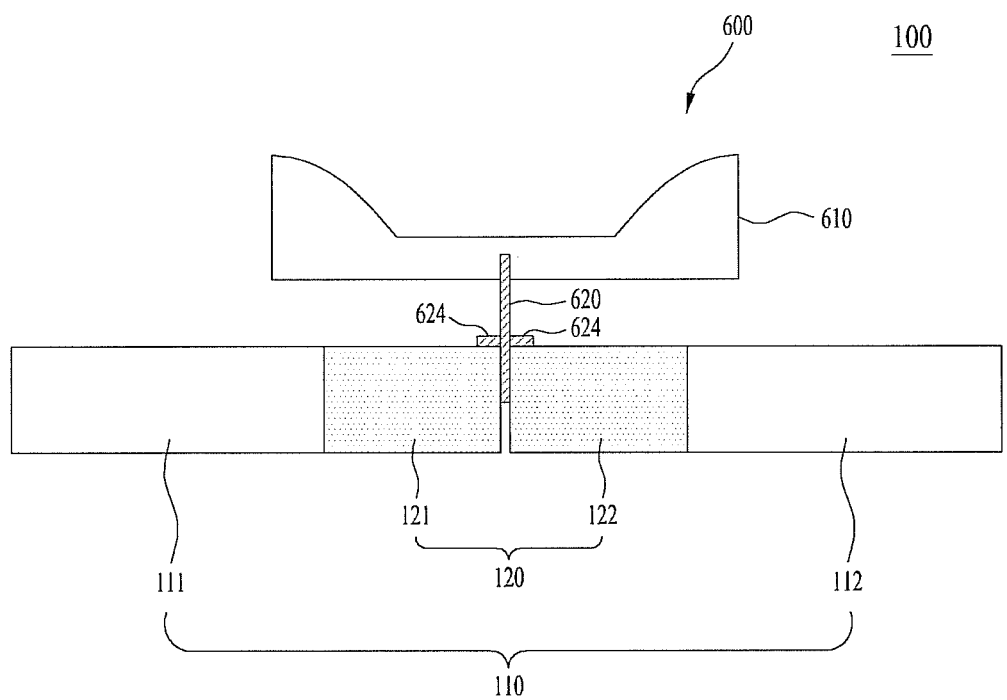
(b)

MULTIVISION DEVICE AND LENS BAR ATTACHED TO THE SAME

Pursuant to 35 U.S.C. §119(a), this application claims the benefit of the Korean Patent Application No. 10-2013-0082892, filed on Jul. 15, 2013, which is hereby incorporated by reference as if fully set forth herein.

BACKGROUND OF THE INVENTION

1. Field of the Invention

The present specification relates to a multivision device and a lens bar attached to the same, and more particularly, to the technology of minimizing a screen spilt zone in a multivision device.

2. Discussion of the Related Art

It is not easy to configure a large sized electric signboard or large sized digital signage as one display panel due to cost, process or technical restrictions. Accordingly, it is general that a multivision type configured by a plurality of display devices connected with one another is used as the large sized electric signboard or large sized digital signage. Accordingly, the plurality of display devices included in one multivision may display their respective images different from one another, or may display one large sized image in combination.

FIG. 1 is a diagram illustrating a multivision device according to the related art.

Referring to FIG. 1, the multivision device 10 of the related art includes a plurality of display devices 10a to 10i which are connected with one another. Each of the display devices 10a to 10i includes a display part 11 and a frame part 12 surrounding the outline of the display part 11.

If the plurality of display devices 10a to 10i are connected with one another to configure one large sized image, as shown in FIG. 1, there is no option but to split a screen due to the frame part 12. In this case, a problem occurs in that a user's or watcher's involvement in the image is reduced and information transfer ability is reduced due to the split screen. Also, even in the case that each of the display devices 10a to 10i displays its respective image different from those of the other devices as well as the case where the multivision device 10 displays one image, a problem still occurs in that the user's or watcher's involvement in the image is reduced due to the split screen.

The above references are incorporated by reference herein where appropriate for appropriate teachings of additional or alternative details, features and/or technical background.

SUMMARY OF THE INVENTION

Accordingly, the present specification is directed to a multivision device and a lens bar attached to the same, which substantially obviate one or more problems due to limitations and disadvantages of the related art.

An object of the present specification is to provide a multivision device and a lens bar attached to the same, in which the lens bar is attached to a frame part of the multivision device to reduce a width of the frame part recognized by a user.

Another object of the present specification is to provide a multivision device and a lens bar attached to the same, in which a shape of a lens is provided to effectively reduce a width of a frame part recognized by a user.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a multivision device according to one embodiment of the present invention comprises a plurality of display parts; a frame part arranged between two adjacent ones of the plurality of display parts; and a lens bar arranged above the frame part, wherein the lens bar includes a first surface, and a second surface which is located at an opposite side of the first surface and faces the frame part, the first surface includes a first area which is gradually close to the second surface towards a center of the lens bar from a side of the lens bar, and an air gap exists between the lens bar and the frame part.

In another aspect of the present invention, a lens bar according to one embodiment of the present invention comprises a body having a first surface and a second surface located at an opposite side of the first surface; and a fixing part located below the body, wherein the first surface includes a first area which is gradually close to the second surface towards a center of the body from a side of the body, the first area exists respectively at both sides of the body on the first surface, and the fixing part has a width narrower than that of the body.

According to one embodiment of the present invention, as the lens bar is attached to the frame part of the multivision device, the width of the frame part recognized by a user may be reduced.

Also, according to one embodiment of the present invention, a shape of a lens may be provided to effectively reduce the width of the frame part recognized by a user.

It is to be understood that both the foregoing general description and the following detailed description of the present specification are exemplary and explanatory and are intended to provide further explanation of the specification as claimed.

BRIEF DESCRIPTION OF THE DRAWINGS

The embodiments will be described in detail with reference to the following drawings in which like reference numerals refer to like elements wherein:

The accompanying drawings, which are included to provide a further understanding of the specification and are incorporated in and constitute a part of this application, illustrate embodiment(s) of the specification and together with the description serve to explain the principle of the specification. In the drawings:

FIG. 12 is a diagram illustrating a side section of a lens bar and a multivision device to which the lens bar is fixed in accordance with one embodiment of the present invention;

FIG. 13 is a diagram illustrating a side section of a lens bar and a multivision device to which the lens bar is fixed in accordance with another embodiment of the present invention;

FIG. 14 is a diagram illustrating a side section of a lens bar and a multivision device to which the lens bar is fixed in accordance with still another embodiment of the present invention;

FIG. 15 is a diagram illustrating a side section of a lens bar and a multivision device to which the lens bar is fixed in accordance with further still another embodiment of the present invention.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

The suffixes "module" and "unit" for the elements used in the following description are given or used in common by considering facilitation in writing this disclosure only but fail to have meanings or roles discriminated from each other. The "module" and "unit" may be used together.

Hereinafter, although the embodiments of the present invention will be described with reference to the accompanying drawings and the disclosure of the accompanying drawings, the present invention is not limited by the embodiments.

Figure 2:
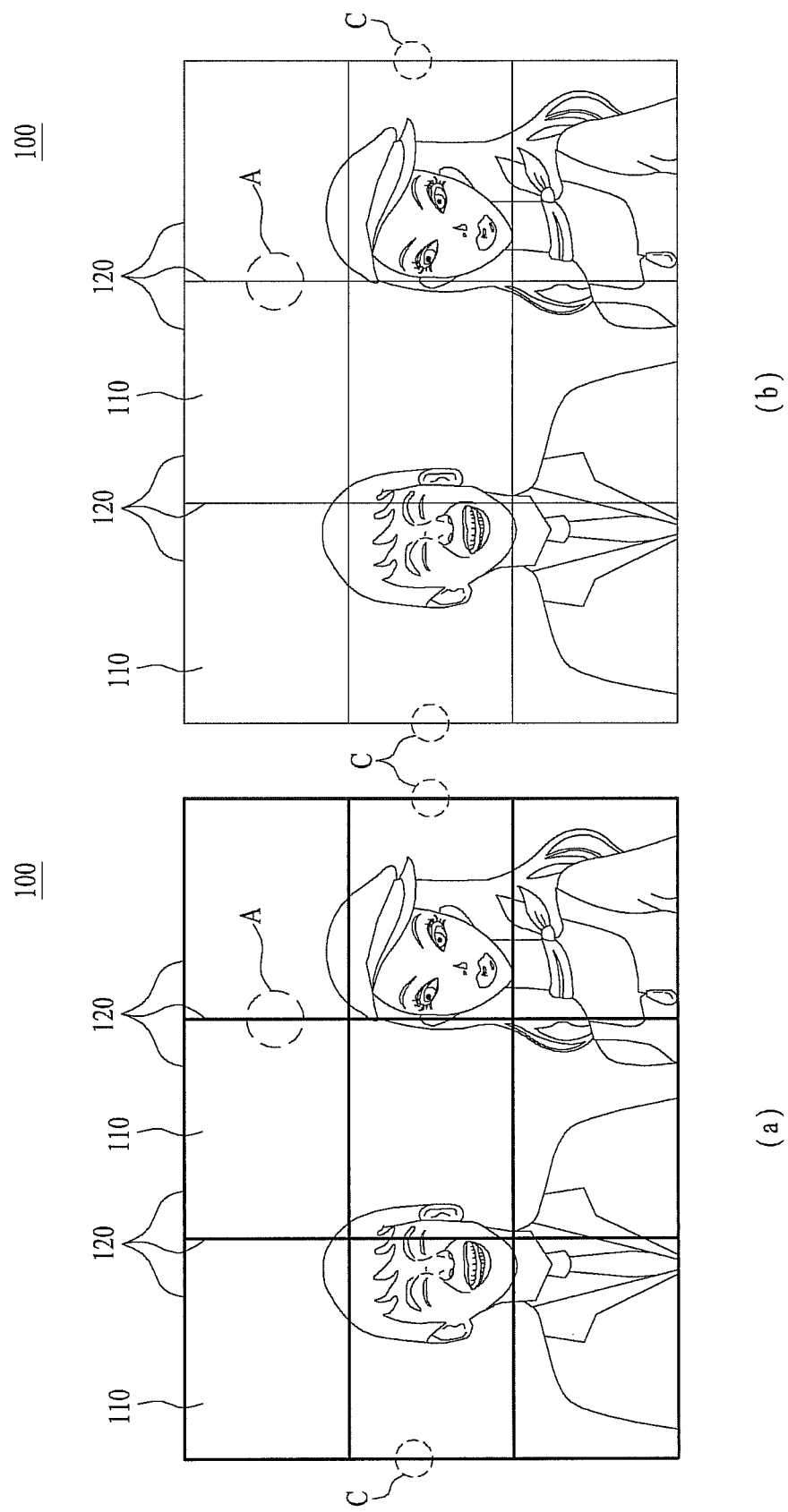
FIG. 2 is a diagram illustrating a multivision device according to one embodiment of the present invention.

FIG. 2 is a diagram illustrating a multivision device according to one embodiment of the present invention.

Referring to (a) and (b) of FIG. 2, the multivision device 100 according to one embodiment of the present invention includes a plurality of display parts 110 and a frame part 120.

The display parts 110 correspond to a zone where an image is displayed, and may display their respective images different from one another or together display one image. The display parts 110 may include a liquid crystal display or an organic light emitting diode (OLED) display.

The frame part 120 is arranged around the display parts 110. The frame part 120 is arranged between two adjacent display parts 110. In case of the frame part 120 surrounding the display parts 110 arranged outside the multivision device 100, the frame part 120 may not be arranged between two adjacent display parts 110.

Since the multivision device 100 configures one large sized screen by connecting the plurality of display parts 110 with one another, a split screen zone occurs due to the frame part 120 arranged between the display parts 110.

Although not shown in detail in FIG. 2, a lens bar is arranged above the frame part 120. Since the light reflected from the edge of the frame part 120 is refracted by the lens bar and enters a user's eyes, the user feels that the width of the frame part 120 is substantially reduced.

Figure 1:
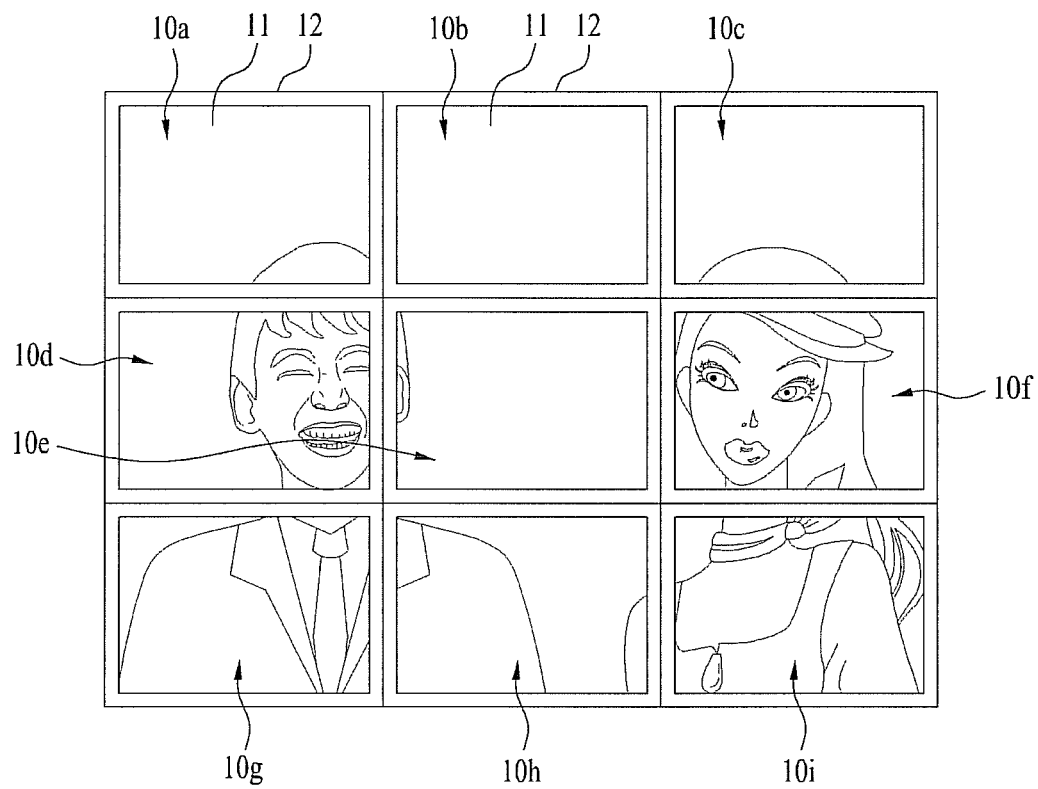
FIG. 1 is a diagram illustrating a multivision device according to the related art.

According to the present invention, as compared with the related art of FIG. 1, the user feels that the width of the frame part 120 becomes narrow substantially as shown in (a) of FIG. 2 or little feels the presence of the frame part 120 as shown in (b) of FIG. 2. A structure and function of the lens bar will be described in more detail with reference to FIG. 3 to FIG. 16.

Accordingly, according to the present invention, split screen effects caused by the frame part 120 may be improved effectively, whereby the user's involvement in the image may be improved and information transfer ability of the multivision device 100 may be improved.

Figure 3:
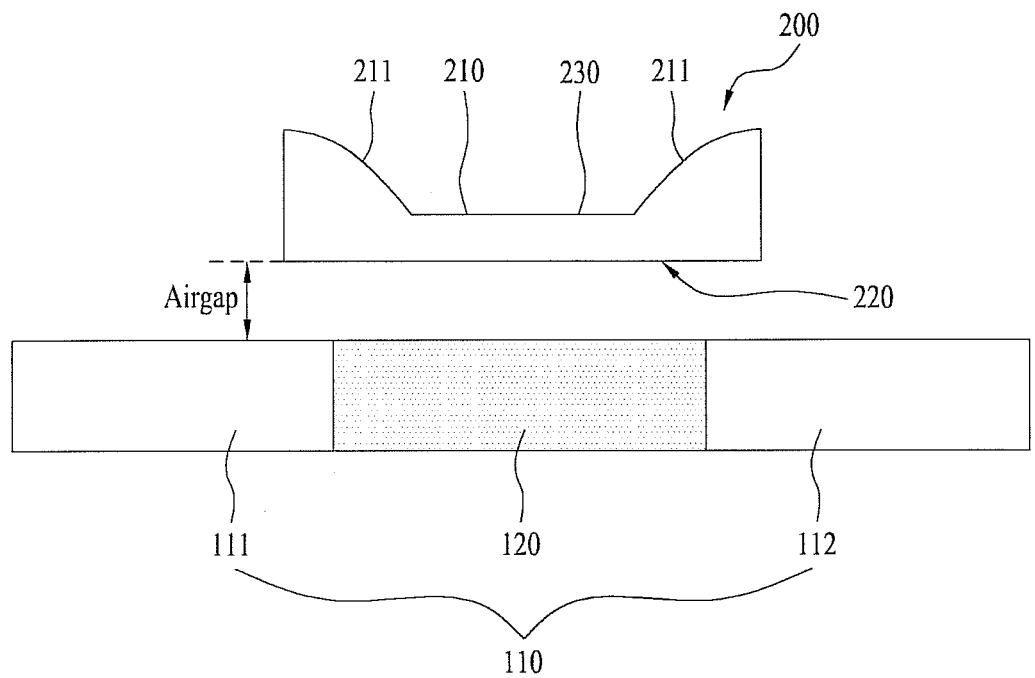
FIG. 3 is an enlarged diagram illustrating a part of a multivision device according to one embodiment of the present invention.
Figure 4:
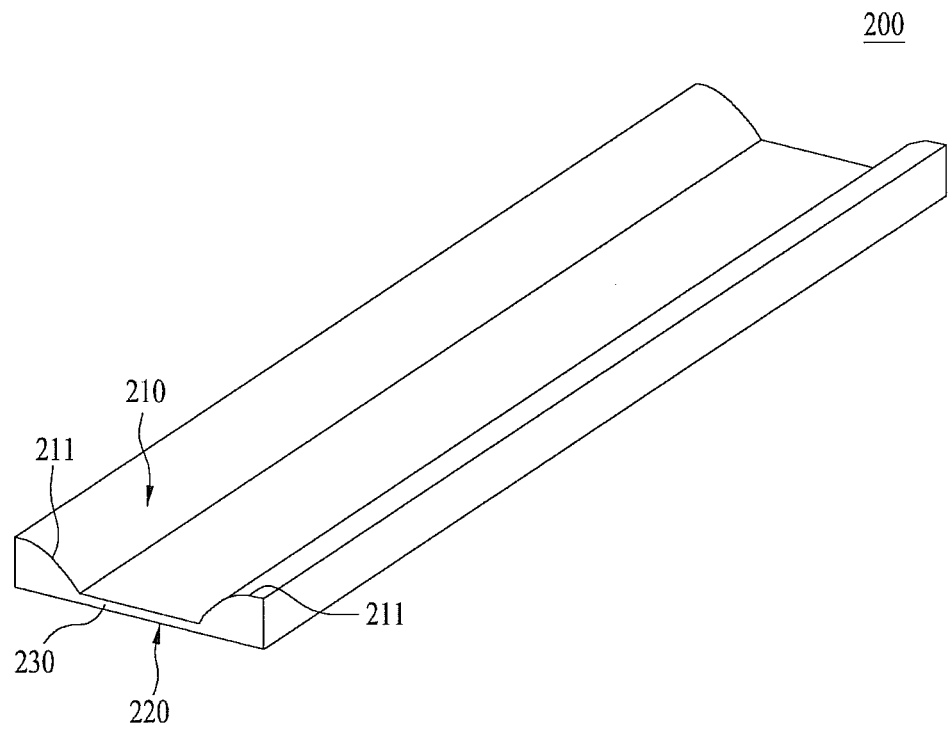
FIG. 4 is a perspective view illustrating a lens bar according to one embodiment of the present invention.

FIG. 3 is an enlarged diagram illustrating a part of a multivision device according to one embodiment of the present invention, and FIG. 4 is a perspective view illustrating a lens bar shown in FIG. 3. For example, FIG. 3 corresponds to a side sectional view of a part A in (a) and (b) of FIG. 2.

Referring to FIG. 3 and FIG. 4, the multivision device 100 according to one embodiment of the present invention includes a plurality of display parts 110, a frame part 120 arranged between two adjacent ones of the plurality of display parts 110, and a lens bar 200 arranged above the frame part 120. The two adjacent display parts 111 and 112 of the plurality of display parts 110 will be referred to as the first display part 111 and the second display part 112.

A fixing type between the frame part 120 and the lens bar 200 will be described with reference to FIG. 13 to FIG. 15. However, it is to be understood that the fixing type between the frame part 120 and the lens bar 200 is not limited to detailed examples of FIG. 13 to FIG. 15. If the lens bar 200 includes a fixing part, a portion of the lens bar 200 except for the fixing part will be referred to as a body.

The lens bar 200 includes a first surface 210 and a second surface 220, wherein the second surface 220 is located at an opposite side of the first surface 210 and faces the frame part 120.

The first surface 210 includes a first area 211 that is gradually close to the second surface 220 towards the center of the lens bar 200 from the side of the lens bar 200. The first area 211 may exist respectively at both sides of the lens bar 200. The side of the lens bar 200 may mean a zone that strays from the center of the lens bar 200 as well as the edge of the lens bar 200.

The first area 211 includes a curved surface. The full area of the first area 211 may be the curved surface, or some of the first area 211 may be the curved surface. If the first area 211 includes the curved surface, a slope of a tangent line of the curved surface may be increased gradually towards the center of the lens bar 200 from the side of the lens bar 200. If the first area 211 includes the curved surface, the curved surface may be a convex shape towards a direction far away from the second surface 220.

The lens bar 200 is arranged such that its side is overlapped with the display parts 110. In other words, one side of the lens bar 200 is overlapped with the first display part 111, and the other side of the lens bar 200 is overlapped with the second display part 112.

Also, the lens bar 200 may be arranged such that the first area 211 is overlapped with the display parts 110 and the frame part 120. In other words, the first area 211 existing at one side of the lens bar 200 may be overlapped with the first display part 111 and the frame part 120, and the first area 211 existing at the other side of the lens bar 200 may be overlapped with the second display part 112 and the frame part 120.

A portion 230 having a constant thickness may exist between the first areas 211 existing at both sides of the lens bar 200. For example, the portion 230 having a constant thickness may be located at the center of the lens bar 200. The width of the portion 230 having a constant thickness may be greater than that of each of the first areas 211 in accordance with the embodiment.

An air gap exists between the lens bar 200 and the frame part 120. The air gap may exist at some portion between the lens bar 200 and the frame part 120. The air gap may be located to correspond to each of both sides of the lens bar 200. Also, the air gap may be located to correspond to the first area 211. In other words, the first area 211 may be overlapped with the air gap.

According to the embodiment, the light reflected from the edge of the frame part 120, which adjoins the display part 110, is refracted on the second surface 220 and the first surface 210 of the lens bar 200. Particularly, the light reflected from the edge of the frame part 120 is refracted on the first area 211 of the lens bar 200, whereby the user views a virtual image of the frame part 120, which is formed on the air gap between the lens bar 200 and the frame part 120. Since the virtual image of the frame part 120 is formed more internally than the actual edge of the frame part 120, the width of the frame part 120, which is recognized by the user, becomes narrow.

Figure 5:
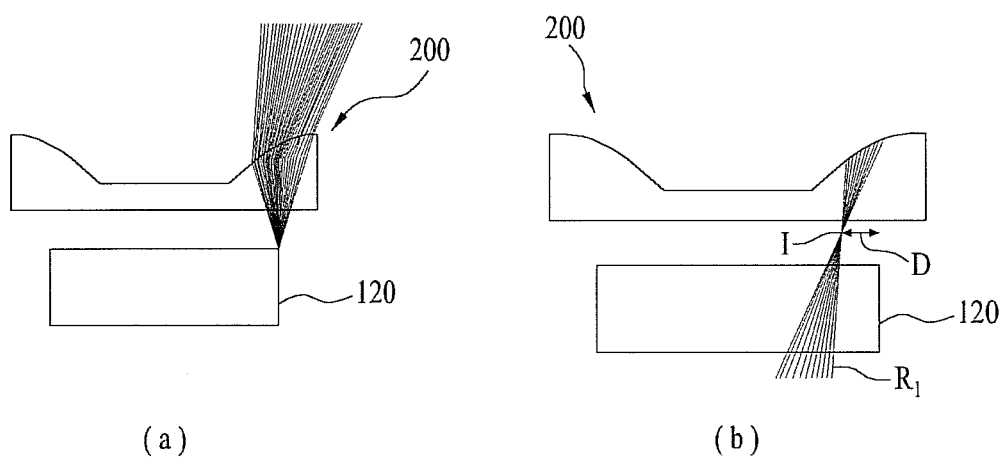
FIG. 5 is a diagram illustrating an effect of a lens bar according to one embodiment of the present invention.

FIG. 5 is a diagram illustrating an effect of a lens bar according to one embodiment of the present invention. (a) of FIG. 5 illustrates that the light reflected from the edge of the frame part 120 is refracted on the lens bar 200, and (b) of FIG. 5 illustrates that a path of the light refracted on the lens bar 200 is backward traced.

The light reflected from the edge of the frame part 120 is primarily refracted on the second surface 220 of the lens bar 200 and secondarily refracted on the first surface 210. The backward trace of the path of the light refracted on the lens bar 200 is shown in $R_1$ of (b) of FIG. 5.

Referring to (b) of FIG. 5, it is noted that the backward traced light path $R_1$ is collected in a random point I between the lens bar 200 and the frame part 120. A virtual image of the edge of the frame part 120 is formed in the point I. The point I corresponds to a virtual focus of the lens bar 200.

If the lens bar 200 does not exist, the user recognizes the width of the frame part 120 as it is. However, according to the embodiment, the user views the virtual image of the frame part 120, which is formed by the lens bar 200, and recognizes that the width of the frame part 120 becomes narrow from both sides as much as the distance D shown in (b) of FIG. 5 because the virtual image is formed more internally than the actual width of the frame part 120.

Figure 6:
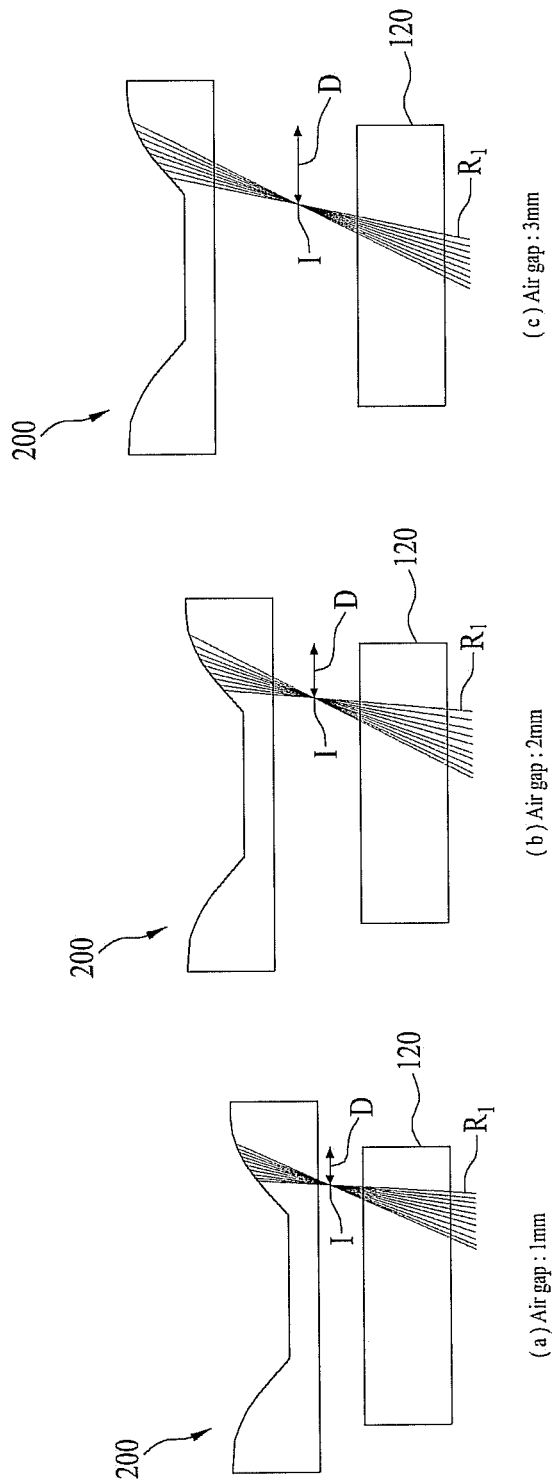
FIG. 6 is a diagram illustrating an effect based on a width of an air gap between a lens bar and a frame part.

FIG. 6 is a diagram illustrating an effect based on a width of an air gap between a lens bar and a frame part. (a) of FIG. 6 illustrates that a path of the light reflected from the lens bar 200 is backward traced if the width of the air gap is 1 mm, (b) of FIG. 6 illustrates that a path of the light refracted from the lens bar 200 is backward traced if the width of the air gap is 2 mm, and (c) of FIG. 6 illustrates that a path of the light refracted from the lens bar 200 is backward traced if the width of the air gap is 3 mm.

Referring to (a) to (c) of FIG. 6, as the width of the air gap between the lens bar 200 and the frame part 120 gradually becomes wide to reach 2 mm and 3 mm from 1 mm, it is noted that the virtual image of the edge of the frame part 120 is formed more internally than the actual image. In other words, as the width of the air gap between the lens bar 200 and the frame part 120 gradually becomes wide to reach 2 mm and 3 mm from 1 mm, the width of the frame part 120 recognized by the user gradually becomes narrow.

Figure 7:
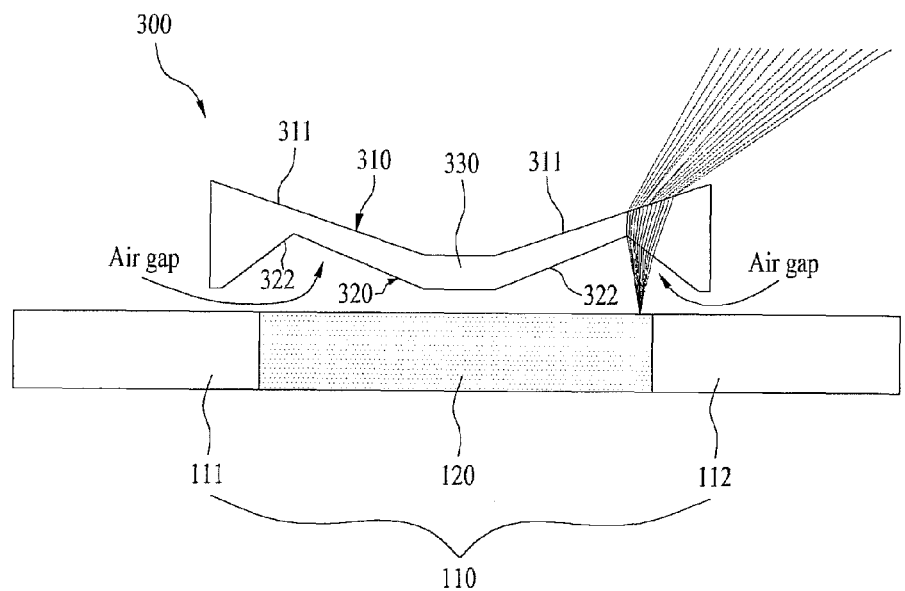
FIG. 7 is an enlarged diagram illustrating a part of a multivision device according to another embodiment of the present invention.
Figure 8:
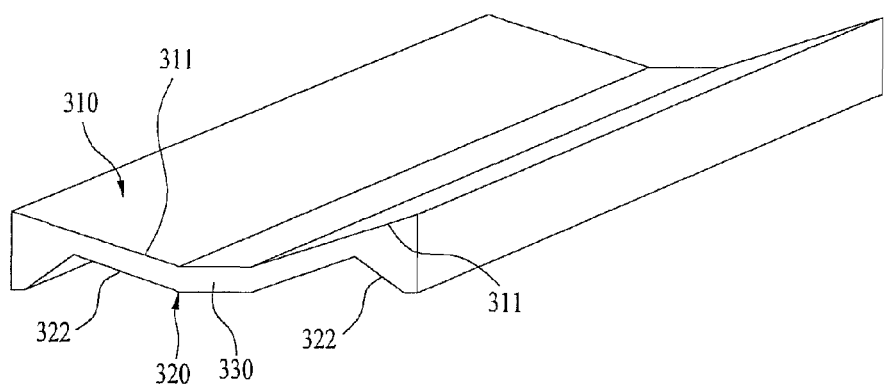
FIG. 8 is a perspective view illustrating a lens bar according to another embodiment of the present invention.

FIG. 7 is an enlarged diagram illustrating a part of a multivision device according to another embodiment of the present invention, and FIG. 8 is a perspective view illustrating a lens bar shown in FIG. 7. For example, FIG. 7 corresponds to a side sectional view of the part A in (a) and (b) of FIG. 2.

Referring to FIG. 7 and FIG. 8, the multivision device 100 according to another embodiment of the present invention includes a plurality of display parts 110, a frame part 120 arranged between two adjacent ones 111 and 112 of the plurality of display parts 110, and a lens bar 300 arranged above the frame part 120. The two adjacent display parts 111 and 112 of the plurality of display parts 110 will be referred to as the first display part 111 and the second display part 112.

A fixing type between the frame part 120 and the lens bar 300 will be described with reference to FIG. 13 to FIG. 15. However, it is to be understood that the fixing type between the frame part 120 and the lens bar 300 is not limited to detailed examples of FIG. 13 to FIG. 15. If the lens bar 300 includes a fixing part, a portion of the lens bar 300 except for the fixing part may be referred to as a body.

The lens bar 300 includes a first surface 310 and a second surface 320, wherein the second surface 320 is located at an opposite side of the first surface 310 and faces the frame part 120.

The first surface 310 includes a first area 311 that is gradually close to the second surface 320 towards the center of the lens bar 300 from the side of the lens bar 300. The first area 311 may exist respectively at both sides of the lens bar 300. The side of the lens bar 300 may mean a zone that strays from the center of the lens bar 300 as well as the edge of the lens bar 300.

The first area 311 may include a plane or a curved surface. The full area of the first area 311 may be the plane or the curved surface, or some of the first area 311 may be the plane or the curved surface.

The lens bar 300 is arranged such that its side is overlapped with the display parts 110. In other words, one side of the lens bar 300 is overlapped with the first display part 111, and the other side of the lens bar 300 is overlapped with the second display part 112.

Also, the lens bar 300 may be arranged such that the first area 311 is overlapped with the display parts 110 and the frame part 120. In other words, the first area 311 existing at one side of the lens bar 300 may be overlapped with the first display part 111 and the frame part 120, and the first area 311 existing at the other side of the lens bar 300 may be overlapped with the second display part 112 and the frame part 120.

A portion 330 having a constant thickness may exist between the first areas 311 existing at both sides of the lens bar 300. For example, the portion 330 having a constant thickness may be located at the center of the lens bar 300. The width of the portion 330 having a constant thickness may be smaller than that of the first area 311 in accordance with the embodiment.

The second surface 320 may include a second area 322 which is concave towards the first surface 310.

The second area 322 may include a plane or a curved surface. The full area of the second area 322 may be the plane or the curved surface, or some of the second area 322 may be the plane or the curved surface.

The second area 322 may be located to correspond to the first area 311. For example, all or some of the second area 322 may be overlapped with the first area 311.

An air gap exists between the lens bar 300 and the frame part 120. The air gap may exist at some portion between the lens bar 300 and the frame part 120. The air gap may be located to correspond to each of both sides of the lens bar 300. Also, the air gap may be located to correspond to the first area 311. In other words, the first area 311 may be overlapped with the air gap. The air gap may be located between the second area 322 and the frame part 120.

According to the embodiment, the light reflected from the edge of the frame part 120, which adjoins the display part 110, is refracted on the second surface 320 and the first surface 310 of the lens bar 300. Particularly, the light reflected from the edge of the frame part 120 is refracted on the second area 322 and the first area 311 of the lens bar 300, whereby the user views a virtual image of the frame part 120, which is formed on the air gap between the lens bar 300 and the frame part 120. Since the virtual image of the frame part 120 is formed more internally than the actual edge of the frame part 120, the width of the frame part 120, which is recognized by the user, becomes narrow.

Figure 9:
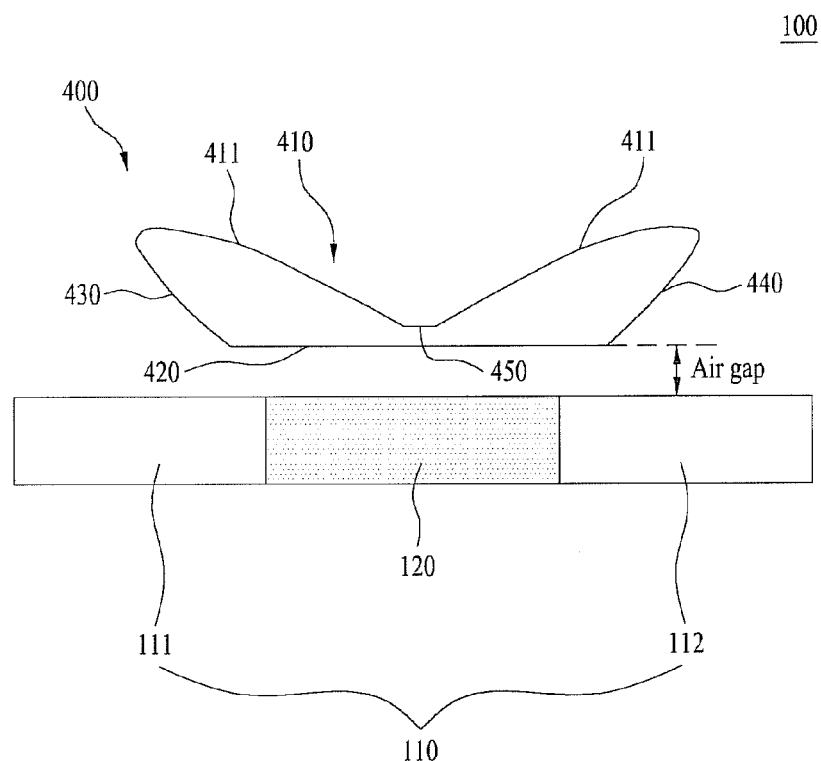
FIG. 9 is an enlarged diagram illustrating a part of a multivision device according to still another embodiment of the present invention.

FIG. 9 is an enlarged diagram illustrating a part of a multivision device according to still another embodiment of the present invention. For example, FIG. 9 corresponds to a side sectional view of the part A in (a) and (b) of FIG. 2.

Referring to FIG. 9, the multivision device 100 according to still another embodiment of the present invention includes a plurality of display parts 110, a frame part 120 arranged between two adjacent ones 111 and 112 of the plurality of display parts 110, and a lens bar 400 arranged above the frame part 120. The two adjacent display parts 111 and 112 of the plurality of display parts 110 will be referred to as the first display part 111 and the second display part 112.

A fixing type between the frame part 120 and the lens bar 400 will be described with reference to FIG. 13 to FIG. 15. However, it is to be understood that the fixing type between the frame part 120 and the lens bar 400 is not limited to detailed examples of FIG. 13 to FIG. 15. If the lens bar 400 includes a fixing part, a portion of the lens bar 400 except for the fixing part may be referred to as a body.

The lens bar 400 includes a first surface 410 and a second surface 420, wherein the second surface 420 is located at an opposite side of the first surface 410 and faces the frame part 120.

The first surface 410 includes a first area 411 that is gradually close to the second surface 420 towards the center of the lens bar 400 from the side of the lens bar 400. The first area 411 may exist respectively at both sides of the lens bar 400. The side of the lens bar 400 may mean a zone that strays from the center of the lens bar 400 as well as the edge of the lens bar 400.

The first area 411 may include a curved surface. The full area of the first area 411 may be the curved surface, or some of the first area 411 may be the curved surface. If the first area 411 includes the curved surface, a slope of a tangent line of the curved surface may be increased gradually towards the center of the lens bar 400 from the side of the lens bar 400. If the first area 411 includes the curved surface, the curved surface may be a convex shape towards a direction far away from the second surface 420.

The lens bar 400 is arranged such that its side is overlapped with the display parts 110. In other words, one side of the lens bar 400 is overlapped with the first display part 111, and the other side of the lens bar 400 is overlapped with the second display part 112.

Also, the lens bar 400 may be arranged such that the first area 411 is overlapped with the display parts 110 and the frame part 120. In other words, the first area 411 existing at one side of the lens bar 400 may be overlapped with the first display part 111 and the frame part 120, and the first area 211 existing at the other side of the lens bar 400 may be overlapped with the second display part 112 and the frame part 120.

The lens bar 400 includes a third surface 430 located between the first surface 410 and the second surface 420, and a fourth surface 440 located at an opposite side of the third surface 430. The third surface 430 may be one side of the lens bar 400, and the fourth surface 440 may be the other side of the lens bar 400.

Each of the third surface 430 and the fourth surface 440 includes a curved surface. The full area of the third surface 430 and the fourth surface 440 may be the curved surface, or some of the third surface 430 and the fourth surface 440 may be the curved surface. If each of the third surface 430 and the fourth surface 440 includes the curved surface, a slope of a tangent line of the curved surface may be increased gradually towards the frame part 120. If each of the third surface 430 and the fourth surface 440 includes the curved surface, the curved surface may be a convex shape towards a direction far away from the center of the lens bar 400.

The third surface 430 and the fourth surface 440 are overlapped with the display part 110. In accordance with the embodiment, the third surface 430 and the fourth surface 440 may be overlapped with the display part 110 but may not be overlapped with the frame part 120.

The interval between the third surface 430 and the fourth surface 440 is not uniform. The lens bar 400 may have a portion where the interval between the third surface 430 and the fourth surface 440 becomes narrow gradually towards the frame part 120. The lens bar 400 may have a portion where the interval between the third surface 430 and the fourth surface 440 becomes narrow gradually towards the lower portion from the upper portion.

A portion 450 having a constant thickness may exist between the first areas 411 existing at both sides of the lens bar 400. For example, the portion 450 having a constant thickness may be located at the center of the lens bar 400. The width of the portion 450 having a constant thickness may be smaller than that of each of the first areas 411 in accordance with the embodiment.

An air gap exists between the lens bar 400 and the frame part 120. The air gap may exist at some portion between the lens bar 400 and the frame part 120. The air gap may be located to correspond to each of both sides of the lens bar 400. Also, the air gap may be located to correspond to the first area 411.

According to the embodiment, the light reflected from the edge of the frame part 120, which adjoins the display part 110, is refracted on the second surface 420 and the first surface 410 of the lens bar 400. Particularly, the light reflected from the edge of the frame part 120 is refracted on the first area 411 of the lens bar 400, whereby the user views a virtual image of the frame part 120, which is formed on the air gap between the lens bar 400 and the frame part 120. Since the virtual image of the frame part 120 is formed more internally than the actual edge of the frame part 120, the width of the frame part 120, which is recognized by the user, becomes narrow.

Figure 10:
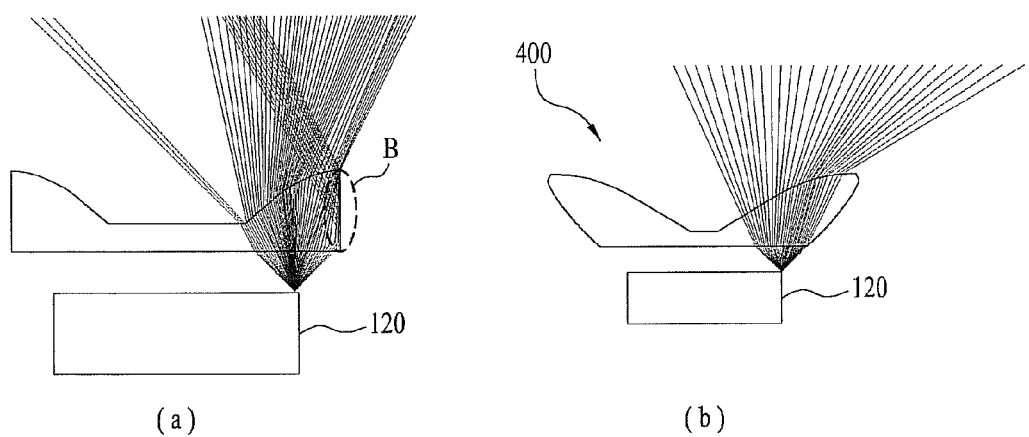
FIG. 10 is a diagram illustrating an effect of a lens bar shown in FIG. 9.

FIG. 10 is a diagram illustrating an effect of a lens bar shown in FIG. 9. (a) of FIG. 10 illustrates that the light reflected from the edge of the frame part 120 is refracted on the lens bar if the side of the lens bar is orthogonal to the frame part 120, and (b) of FIG. 10 illustrates that the light refracted from the edge of the frame part 120 is refracted on the lens bar if the side of the lens bar 400 includes a curved surface.

Referring to (a) of FIG. 10, it is noted that the light reflected from the edge of the frame part 120 is totally reflected from the side B of the lens bar. For this reason, the side B of the lens bar may be viewed to be cloudy when the user views the screen at an angle of 45°.

On the other hand, referring to (b) of FIG. 10, the side of the lens bar 400 is formed as the curved surface to reduce the amount of the light totally reflected from the side of the lens bar 400, whereby the phenomenon that the side of the lens bar is viewed to be cloudy even though the user views the screen at an angle of 45° may be improved.

Figure 11:
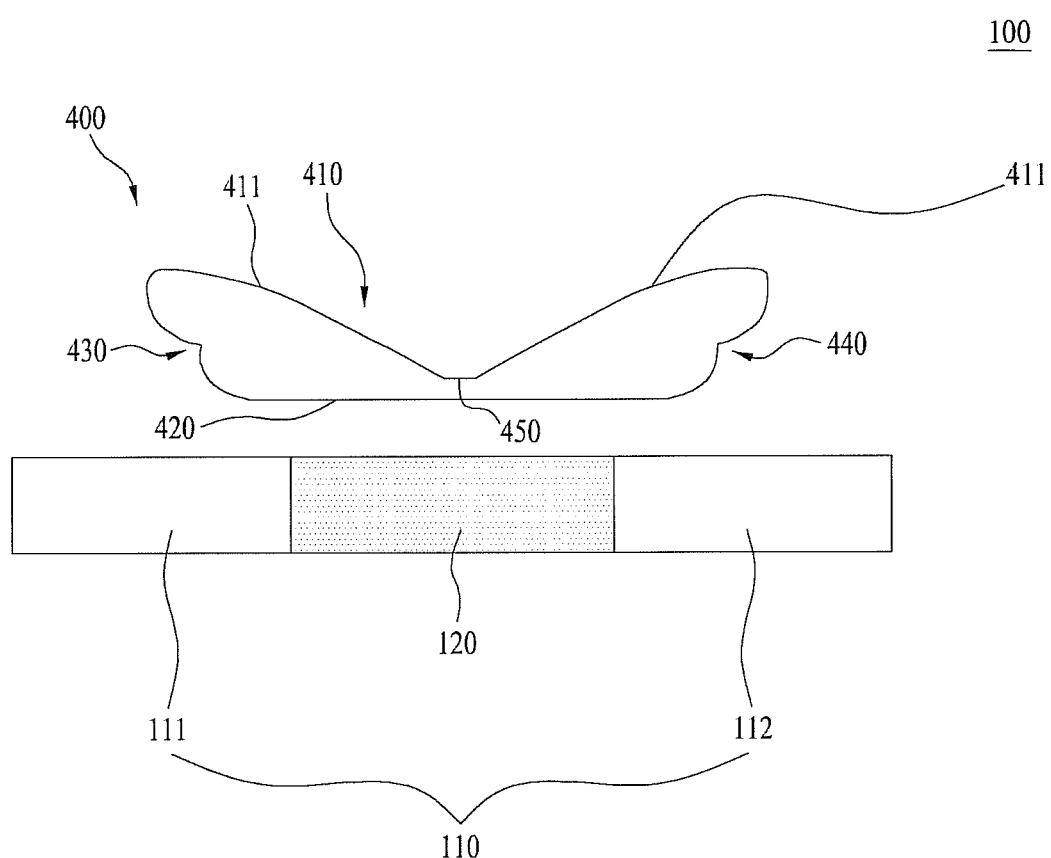
FIG. 11 is an enlarged diagram illustrating a part of a multivision device according to further still another embodiment of the present invention.

FIG. 11 is an enlarged diagram illustrating a part of a multivision device according to further still another embodiment of the present invention. For example, FIG. 11 corresponds to a side sectional view of the part A in (a) and (b) of FIG. 2. The description of FIG. 11, which is repeated with the embodiment of FIG. 9, will be omitted, and will be made based on the difference with the embodiment of FIG. 9.

The lens bar 400 includes a first surface 410, a second surface 420, which is located at an opposite side of the first surface 410 and faces the frame part 120, a third surface 430 located between the first surface 410 and the second surface 420, and a fourth surface 440 located at an opposite side of the third surface 430.

Each of the third surface 430 and the fourth surface 440 includes at least two curved surfaces. Each of the curved surfaces included in the third surface 430 and the fourth surface 440 may have a slope of a tangent line, which is reduced gradually towards the frame part 120, or may have a slope of a tangent line, which is increased gradually towards the frame part 120 and then reduced.

Since the other features according to the embodiment of FIG. 11 are the same as those described with reference to FIG. 9 and FIG. 11, they will be omitted.

FIG. 12 is a diagram illustrating a side section of a lens bar and a multivision device to which the lens bar is fixed in accordance with one embodiment of the present invention.

Referring to (a) of FIG. 12, the lens bar 600 according to one embodiment of the present invention includes a body 610 and a fixing part 620 located below the body 610. A shape of the body 610 shown in FIG. 12 is only exemplary, and its detail is not limited to the example of FIG. 12. Since the detailed features of the body 610 are the same as those of the lens bar described with reference to FIG. 3 to FIG. 11, their detailed description will be omitted. In other words, the body 610 may have any one shape of the lens bars described with reference to FIG. 3 to FIG. 11.

The body 610 includes a first surface 611, and a second surface 612 which is located at an opposite side of the first surface 611. The first surface 611 includes a first area 611a which is gradually close to the second surface 612 towards the center of the body 610 from the side of the body 610. The first area 611a exists respectively at both sides of the body 610 on the first surface 611.

The lens bar 610 is fixed to the frame part 120 through the fixing part 620. The fixing part 620 is formed such that its width is narrower than that of the body 610. Accordingly, if the lens bar 610 is fixed to the frame part 120 through the fixing part 620, as shown in (b) of FIG. 12, an air gap is formed between the lens bar 610 and the frame part 120.

The fixing part 620 may be projected towards the frame part 120.

The fixing part 620 includes a support member 621 and an adhesive member 622. The support member 621 supports the body 610 in contact with the body 610, and the adhesive member 622 connects the support member 621 with the frame part 120, so that the lens bar 610 may firmly be fixed to the support member 120. In accordance with the embodiment, the support member 621 may be formed in a single body with the body 610.

FIG. 13 is a diagram illustrating a side section of a lens bar and a multivision device to which the lens bar is fixed in accordance with another embodiment of the present invention.

Referring to (a) of FIG. 13, the lens bar 600 according to another embodiment of the present invention includes a body 610 and a fixing part 620 located below the body 610. A shape of the body 610 shown in FIG. 13 is only exemplary, and its detail is not limited to the example of FIG. 13. Since the detailed features of the body 610 are the same as those of the lens bar described with reference to FIG. 3 to FIG. 11, their detailed description will be omitted. In other words, the body 610 may have any one shape of the lens bars described with reference to FIG. 3 to FIG. 11.

The body 610 includes a first surface 611, and a second surface 612 which is located at an opposite side of the first surface 611. The first surface 611 includes a first area 611a which is gradually close to the second surface 612 towards the center of the body 610 from the side of the body 610. The first area 611a exists respectively at both sides of the body 610 on the first surface 611.

The lens bar 610 is fixed to the frame part 120 through the fixing part 620. The fixing part 620 is formed such that its width is narrower than that of the body 610. Accordingly, if the lens bar 610 is fixed to the frame part 120 through the fixing part 620, as shown in (b) of FIG. 13, an air gap is formed between the lens bar 610 and the frame part 120.

The fixing part 620 may be projected towards the frame part 120.

The frame part 120 may include a first subframe part 121 which adjoins the first display part 111 adjacent to one side of the frame part 120, and a second subframe part 122 which adjoins the second display part 112 adjacent to the other side of the frame part 120. One portion of the fixing part 620 may be inserted between the first subframe part 121 and the second subframe part 122.

In more detail, the fixing part 620 includes a support member 621 and an insertion member 623. The support member 621 supports the body 610 in contact with the body 610, and the insertion member 623 connects the support member 621 with the frame part 120, so that the lens bar 610 may firmly be fixed to the support member 120. In accordance with the embodiment, the support member 621 may be formed in a single body with the body 610.

If the lens bar 610 is fixed to the frame part 120, one portion of the insertion member 623 may be inserted between the first subframe part 121 and the second subframe part 122.

One end of the insertion member 623 may be inserted to the support member 621, and the other end of the insertion member 623 may be inserted between the first subframe part 121 and the second subframe part 122.

FIG. 14 is a diagram illustrating a side section of a lens bar and a multivision device to which the lens bar is fixed in accordance with still another embodiment of the present invention.

Referring to (a) of FIG. 14, the lens bar 600 according to another embodiment of the present invention includes a body 610 and a fixing part 620 located below the body 610. A shape of the body 610 shown in FIG. 14 is only exemplary, and its detail is not limited to the example of FIG. 14. Since the detailed features of the body 610 are the same as those of the lens bar described with reference to FIG. 3 to FIG. 11, their detailed description will be omitted. In other words, the body 610 may have any one shape of the lens bars described with reference to FIG. 3 to FIG. 11.

The body 610 includes a first surface 611, and a second surface 612 which is located at an opposite side of the first surface 611. The first surface 611 includes a first area 611a which is gradually close to the second surface 612 towards the center of the body 610 from the side of the body 610. The first area 611a exists respectively at both sides of the body 610 on the first surface 611.

The lens bar 610 is fixed to the frame part 120 through the fixing part 620. The fixing part 620 is formed such that its width is narrower than that of the body 610. Accordingly, if the lens bar 610 is fixed to the frame part 120 through the fixing part 620, as shown in (b) of FIG. 14, an air gap is formed between the lens bar 610 and the frame part 120.

The fixing part 620 may be projected towards the frame part 120.

The frame part 120 may include a first subframe part 121 which adjoins the first display part 111 adjacent to one side of the frame part 120, and a second subframe part 122 which adjoins the second display part 112 adjacent to the other side of the frame part 120. One portion of the fixing part 620 may be inserted between the first subframe part 121 and the second subframe part 122.

The fixing part 620 may be formed such that its full width corresponds to the interval between the first subframe part 121 and the second subframe part 122. The width of the fixing part 620 may be uniform.

FIG. 15 is a diagram illustrating a side section of a lens bar and a multivision device to which the lens bar is fixed in accordance with further still another embodiment of the present invention. The description of FIG. 15, which is repeated with the embodiment of FIG. 14, will be omitted, and will be made based on the difference with the embodiment of FIG. 14.

The fixing part 620 of the lens bar 600 includes a projection 624. The projection 624 is projected in a horizontal direction from the fixing part 620.

The projection 624 may serve to guide how much the fixing part 620 should be inserted between the first subframe part 121 and the second subframe part 122 when the lens bar 600 is fixed to the frame part 120, and may allow the lens bar 600 to be fixed to the frame part 120 more firmly.

Figure 16:
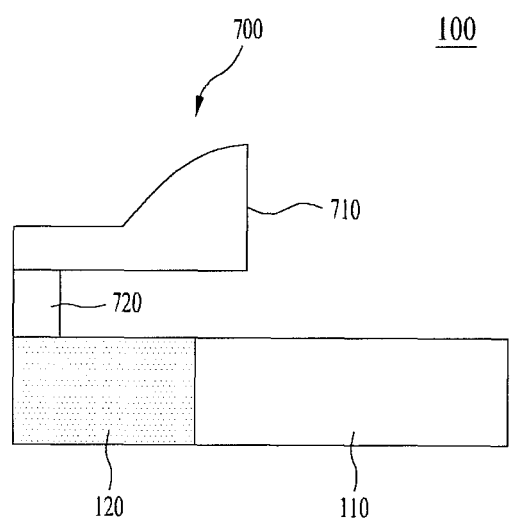
FIG. 16 is an enlarged diagram illustrating a part of a multivision device according to further still another embodiment of the present invention.

FIG. 16 is an enlarged diagram illustrating a part of a multivision device according to further still another embodiment of the present invention. For example, FIG. 16 corresponds to a side sectional view of the part C in (a) and (b) of FIG. 2.

Referring to FIG. 16, the multivision device 100 according to further still another embodiment of the present invention includes a plurality of display parts 110 and a frame part 120 adjacent to the display parts 110. The frame part 120 corresponds to one arranged around the outer display part 110 of the multivision device 100.

A lens bar 700 includes a body 710 and a fixing part 720 arranged below the body 710.

Since the lens bar 700 is the same as that described with reference to FIG. 3 to FIG. 15 except that the lens bar 700 corresponds to a half shape of that described with reference to FIG. 3 to FIG. 15, its detailed description will be omitted. A shape of the lens bar 700 shown in FIG. 16 is only exemplary, and its detail is not limited to the example of FIG. 16.

Although the description may be made for each of the drawings for convenience of description, the embodiments of the respective drawings may be incorporated to achieve a new embodiment.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens bar comprising:
   a body having a first surface and a second surface located at an opposite side of the first surface; and
   a fixing part located below the body, wherein the first surface includes a first area which is gradually close to the second surface towards a center of the body from a side of the body, and the first area exists respectively at both sides of the body on the first surface, and
   wherein the fixing part is located at a center line of the second surface of the body and includes a projection, a support member and an insertion member, wherein the support member has a width narrower than that of the body, and wherein the projection is projected in a horizontal direction from the fixing part, and
   one end of the insertion member is inserted into the support member.

2. The lens bar according to claim 1, wherein the first area includes a curved surface.

3. The lens bar according to claim 2, wherein the curved surface is convex towards a direction far away from the second surface.

4. The lens bar according to claim 1, wherein the first area exists respectively at both sides of the lens bar on the first surface.

5. The lens bar according to claim 4, wherein the lens bar has a portion having a constant thickness between the first areas.

6. A multivision device comprising:
   a plurality of display parts;
   a frame part disposed between two adjacent ones of the plurality of display parts; and
   a lens bar disposed above the frame part, wherein the lens bar includes a first surface, and a second surface which is located at an opposite side of the first surface and faces the frame part, the first surface includes a first area which is gradually close to the second surface towards a center of the lens bar from a side of the lens bar, and an air gap exists between the lens bar and the frame part, wherein the lens bar further includes a fixing part located between the second surface and the frame part, and the fixing part is located at a center line of the second surface, wherein the fixing part includes a projection, a support member and an insertion member, and the projection is projected in a horizontal direction from the fixing part and the insertion member is inserted into the support member.

7. The multivision device according to claim 6, wherein the side of the lens bar is overlapped with the display part.

8. The multivision device according to claim 6, wherein the first area of the lens bar is overlapped with the frame part and the display part.

9. The multivision device according to claim 6, wherein the first area is overlapped with the air gap.

10. The multivision device according to claim 6, wherein the first area includes a curved surface which is convex towards a direction far away from the second surface.

11. The multivision device according to claim 6, wherein the fixing part is projected towards the frame part.

12. The multivision device according to claim 6, wherein the lens bar is fixed to the frame part by an adhesive member disposed between the fixing part and the frame part.

13. The multivision device according to claim 6, wherein the frame part includes a first subframe part which adjoins a first display part adjacent to one side of the frame part, and a second subframe part which adjoins the second display part adjacent to the other side of the frame part, and one portion of the insertion member is inserted between the first subframe part and the second subframe part.

14. The multivision device according to claim 6, wherein the light reflected from the edge of the frame part is refracted respectively on the second surface and the first surface of the lens bar.

15. The multivision device according to claim 6, wherein the side of the lens bar is overlapped with the display part.

16. The multivision device according to claim 6, wherein the second surface includes a second area which is concave towards the first surface.

17. The multivision device according to claim 16, wherein an air gap exists between the second area and the frame part.

18. The multivision device according to claim 6, wherein the lens bar includes a third surface located between the first surface and the second surface and a fourth surface located at an opposite side of the third surface, and each of the third surface and the fourth surface includes a curved surface.

19. The multivision device according to claim 18, wherein the lens bar has a portion where an interval between the third surface and the fourth surface gradually becomes narrow towards the frame part.

\* \* \* \* \*